United States Patent
Dubey et al.

(10) Patent No.: US 12,247,952 B2
(45) Date of Patent: Mar. 11, 2025

(54) ULTRASONIC PULSE VELOCITY TESTER DEVICE WITH THRESHOLD ERROR CORRECTION

(71) Applicant: Council of Scientific and Industrial Research, New Delhi (IN)

(72) Inventors: Premshankar Kedarnath Dubey, New Delhi (IN); Sanjay Yadav, New Delhi (IN); Piyush, New Delhi (IN)

(73) Assignee: Council of Scientific and Industrial Research, New Delhi (IN)

( * ) Notice: Subject to any disclaimer, the term of this patent is extended or adjusted under 35 U.S.C. 154(b) by 253 days.

(21) Appl. No.: 17/936,018

(22) Filed: Sep. 28, 2022

(65) Prior Publication Data

US 2023/0127960 A1    Apr. 27, 2023

(30) Foreign Application Priority Data

Oct. 21, 2021   (IN) .............................. 202111048097

(51) Int. Cl.
| | |
|---|---|
| *G01N 29/44* | (2006.01) |
| *G01H 5/00* | (2006.01) |
| *G01N 29/07* | (2006.01) |
| *G01N 29/34* | (2006.01) |

(52) U.S. Cl.
CPC ......... *G01N 29/4463* (2013.01); *G01N 29/07* (2013.01); *G01N 29/343* (2013.01);
(Continued)

(58) Field of Classification Search
CPC ........ G01N 29/00; G01N 29/07; G01N 29/34; G01N 29/343; G01N 29/44–52;
(Continued)

(56) References Cited

U.S. PATENT DOCUMENTS

| | | | | |
|---|---|---|---|---|
| 4,364,114 A | * | 12/1982 | Renzel | ..................... G01H 5/00 |
| | | | | 702/143 |
| 4,429,575 A | | 2/1984 | Akishika | |

(Continued)

FOREIGN PATENT DOCUMENTS

| | | |
|---|---|---|
| CN | 104251882 A | 12/2014 |
| CN | 104833322 A | 8/2015 |

(Continued)

*Primary Examiner* — Nguyen Q. Ha
(74) *Attorney, Agent, or Firm* — Workman Nydegger (57) ABSTRACT

Ultrasonic pulse velocity is a parameter for assessing strength of concrete structures and studying elastic properties. A method involves transmission of longitudinal ultrasound by a transmitting transducer and receiving by a similar transducer. A transit time-measurement and associated triggering pulses provide the overall time-measurement resolution of at least 1 μs. An ultrasonic pulse velocity measuring device capable of generating ultrasound in the solid materials supporting the propagation of ultrasound and precisely measuring the ultrasonic propagation delay time or the transit time is also disclosed. An ultrasonic transit time measurement device having provision for automatic pulse threshold error correction is also disclosed. A method to realize fast counting for generation of high resolution with relatively slower microcontrollers is also disclosed. Accuracy in the transit time measurement is improved by subtracting the threshold corrected zero offset (without material under test) from the threshold corrected transit time (with sample).

14 Claims, 8 Drawing Sheets

(52) U.S. Cl.
CPC ... *G01N 29/4427* (2013.01); *G01N 2291/011* (2013.01); *G01N 2291/0232* (2013.01); *G01N 2291/02827* (2013.01); *G01N 2291/0421* (2013.01)

(58) Field of Classification Search
CPC .......... G01N 29/4427; G01N 29/4463; G01N 2291/011; G01N 2291/0232; G01N 2291/02827; G01N 2291/0421; G01H 5/00
See application file for complete search history.

(56) References Cited

U.S. PATENT DOCUMENTS

| | | |
|---|---|---|
| 5,275,051 A | 1/1994 | De Beer |
| 5,412,990 A | 5/1995 | D'Angelo et al. |
| 5,974,886 A * | 11/1999 | Carroll ................ G01B 17/025 73/598 |
| 6,941,819 B1 | 9/2005 | Maki, Jr. et al. |
| 8,997,550 B2 | 4/2015 | Smith et al. |
| 2014/0020468 A1 | 1/2014 | Smith et al. |
| 2014/0096586 A1* | 4/2014 | Shen ....................... G01F 25/00 73/1.24 |

FOREIGN PATENT DOCUMENTS

| | | |
|---|---|---|
| EP | 1780539 A1 | 5/2007 |
| GB | 1279865 | 6/1972 |
| SU | 1647382 A1 | 5/1991 |

* cited by examiner

ULTRASONIC PULSE VELOCITY TESTER DEVICE WITH THRESHOLD ERROR CORRECTION

FIELD OF THE INVENTION

The present invention relates to an ultrasonic pulse velocity tester device with threshold error correction.

The present invention particularly relates to a ultrasonic pulse velocity measuring device capable of generating ultrasound preferably in solid materials and precisely measuring the ultrasonic propagation delay time commonly known as the transit time. More particularly, the present invention relates to an improved ultrasonic pulse velocity tester device having provision for pulse threshold error detection and automatic correction. The invention also discloses the method to achieve fast counting of clock pulses for the generation of high resolution with relatively slower microcontrollers.

BACKGROUND OF THE INVENTION

Ultrasonic pulse velocity (UPV) is an extremely useful parameter to investigate the mechanical properties of bulk materials such as metals, composites and concrete structures. By measuring the ultrasonic transit time through the material other related properties such as dynamic modulus of elasticity and dynamic Poisson's ratio can be estimated.

Generally, the device used for ultrasonic transit time measurement consists of a high voltage pulser (500V to 1000V) used to excite the piezoelectric transducer and transmit ultrasonic pulses in burst. The pulser is triggered with the timing circuit to generate repeated pulses. The transmitting ultrasonic transducer is coupled to the sample with suitable couplant introduces ultrasonic waves in the sample. The burst ultrasound travels through the sample and is detected by the other similar ultrasonic transducer placed at other location or on opposite side of the sample. The receiving transducer converts the ultrasonic pulses into electrical pulses. These pulses are used to estimate the ultrasonic time delay through the material path.

The time between the ultrasound generation and reception by the receiving transducer is precisely measured by the time measuring circuit and electronic clock counters are widely used for this purpose Reference may be made to European patent (EP 1 780 539 A1) by Fujimitsu Engineering Co., Ltd. wherein the disclosed invention is the ultrasonic non-destructive method for the estimation of compressive strength in the concrete structures. The methodology includes transmission of longitudinal waves by the transmitting transducer and longitudinal waves are received as the first reflected and other consecutive pulses (generally, 1.3 to 1.7 times of first pulse delay) includes mode conversion. The main receiving system contains an amplifier for amplifying signals from the receiving probe and A/D converter for digitization of the signals amplified by this amplifier. The logic of averaging the digitized waveforms on the same time axis is also included.

Another reference is made to ASTM international standard: (ASTM: C597-09), which covers the recommendations of the propagation velocity (transit time) of longitudinal stress wave pulses through concrete. The suggested method involves transmission of longitudinal ultrasound by transmitting probe and receiving by a suitable similar transducer. The transit time-measurement and the associated triggering pulses must provide the overall time-measurement resolution of at least 1 μs. Time measurement is initiated by a triggering pulse generator, and the time measuring circuit shall operate at the repetition frequency of minimum 3 Hz.

Yet another reference is made to (U.S. Pat. No. 4,429,575) by Tameyuki Akishika, wherein the invention discloses a method and apparatus for the inspection of non-metallic objects by the generation of impact elastic waves to estimate the thickness of the non-metallic objects or concrete structure. Impact elastic waves are generated and transmitted into non-metallic object by striking an impact plate mounted upon with a hammer or similar. The impact plate is coupled to an ultrasonic piezoelectric disc to receive the specific frequency from the generated impact. The time of detection of the reflected waves is compared with receiving time of the impact elastic waves to estimate the time delay.

Yet another reference is made to Chinese patent (CN104251882A) by Hu Weidong wherein the disclosed invention is related to the establishment of a method for concrete compression strength curve. The approach uses new standard ultrasonic rebound comprehensive method to detect concrete strength and establishment of locally dedicated curve of the concrete compression strength detected by the ultrasonic rebound comprehensive method using experimentation and statistical data analysis to finally obtain ultrasonic rebound detected strength by regression formula Yet another reference is made to Chinese patent (CN104833322A) by Zou Lei at al wherein the disclosed invention is device and method for the surface crack detection of concrete. Two ultrasonic plane wave probes along with wheel type encoder arrangement to sense the movement are included. The described invention is applicable for the detection of concrete surface shallow fracture wherein the depth is not more than 500 mm.

Yet another reference is made to (U.S. Pat. No. 5,275,051A) by Harry T. De Beer. Herein the disclosed invention is a method and measurement system for ultrasonic testing of railroad track crossties made of concrete or wood. The system includes an electric pulse generator and a pair of transmitting and receiving transducers. The uniqueness of invention includes transducers fixed in such a way that it is brought into moving contact with the crossties at respective locations.

Yet another reference is made to D'Angelo et al. (U.S. Pat. No. 5,412,990A). Herein the disclosed invention is a method of determination of the setting time of cement slurry using an ultrasonic method. The technique includes generation of ultrasonic shear waves and compression waves at the first location and determining the time for which the shear wave propagates to the second location through the slurry. The detection of the transmitted shear wave signal and the corresponding increase in the propagation velocity of the transmitted longitudinal wave indicates the thickening of the slurry.

Yet another reference is made to Maki, Jr. et al. (U.S. Pat. No. 6,941,819 B1) wherein the disclosed invention is a transducer for Simultaneous generation of compression and shears waves in a cement Sample. The transducer allows the measurement of the shear wave velocity and compressional wave velocity in a universal cement analyzer cell in order to determine dynamic mechanical properties, i.e., Poisson's ratio and Young's modulus, as well as other properties of a cement Sample.

Yet another reference is made to Smith et al. (US 20140020468A1) wherein the disclosed invention is a method for the determination of dimension and particularly thickness using ultrasonic approach at different temperature.

The technique involves transmission of an ultrasonic signal into the material and receiving the reflected ultrasound from the opposite side boundary. The time delay of the received signal represented the thickness of the material. The step of determining the time of flight value comprises sampling the data generally from 10,000 sample to 80,000 and repeating the procedure.statistical analysis was used to estimate zero intercept for the desired temperature.

Yet another reference is made to United Kingdom patent (GB1279865) by Izmail Samuilovich Vainshtock et al. wherein the disclosed invention is an apparatus for measurement of ultrasonic transit time in concrete which reveals information about the strength. The method involves excitation with reference oscillator to generate pulses to feed to the second clock generator and the coincidence detector and provides sync pulses of the order of 30-40 pulses per second. These pulses further trigger another oscillator which ultimately excites the transducer and the pulses are also fed through a switched delay assembly. An oscilloscope is proposed to be used for the time comparison and measurement.

Yet another reference may be made to the Soviet Union patent (SU1647382) by Igor VasilievichZonov et al wherein the disclosed invention is the method of ultrasonic nondestructive testing generally applied to the materials having an increased ultrasonic attenuation. The approach consists of a synchronizer connected to the output of the last N probing pulse generators and N ultrasonic transducers. The clock generator and computing unit connected in series by the second switch, amplifier and driver pulse.

Yet another reference is made to (U.S. Pat. No. 8,997,550) by Smith et al wherein the disclosed invention is the system for correcting the temperature effects on ultrasonic time of flight (TOF) measurement. The TOF correction is computed based on the error in the clock signal in the time of flight measurements at two different temperatures. This results in more accurate TOF measurement.

Therefore, it has been observed that the measurement of ultrasonic propagation velocity in concrete or metals etc is extremely important in order to assess the quality and compressive strength. The present invention presents a measurement method and an apparatus for ultrasonic transit time measurement. The approach uses through transmission with two separate piezoelectric transducers for transmission and reception respectively. The disclosed invention particularly involves a method for detection of zero amplitude point of the received ultrasonic pulse signal by electronic circuit. The invention also discloses an approach to use slow internal counters of microcomputer generally known as microcontrollers to count at effectively higher counting rate than its capability to achieve high resolution ultrasonic transit time measurement.

OBJECTIVES OF THE INVENTION

The main objective of the present invention is to provide a method and device for ultrasonic transit time measurement.

Another objective of the present invention is to provide a method for the automatic threshold error correction in the transit time measurement.

Yet another objective of the present invention is to develop more accurate transit time measurement by subtracting the threshold corrected zero offset (without material under test) from the threshold corrected transit time (with material under test). In one example, an accurate transit time measurement is obtained by subtracting a threshold corrected zero offset without material under test from a threshold corrected transit time with material under test.

Yet another objective of the present invention is to provide new circuit design and methodology to effectively run the counters of microcontroller at higher clock rates than its own capacity.

Yet another objective of the present invention is to provide extremely high resolution of up to 10 ns or better in the measurement of ultrasonic transit time.

SUMMARY OF THE INVENTION

The present invention disclosed herein is related to the design of device for the measurement of ultrasonic transit time in any metallic or non metallic objects or concrete material or the material supporting ultrasonic propagation.

The device generates sharp high voltage excitation pulses in broadband mode to excite the piezoelectric transducer for the generation of ultrasonic waves in the material under test. The generation of ultrasonic frequency may be at the fundamental frequency of the transducer as well as odd harmonics. At the receiver, the received signal is sufficiently amplified and filtered for the desired frequency. The amplified signal is then filtered by an envelope detector. The RF filtered and envelope detected signal is compared by at least two fast comparators to detect the time of arrival of signal at the receiving transducer. The detection of pulse signal is fed to the microcontroller or similar device to compute the transit time.

Accordingly, the present invention provides an ultrasonic pulse velocity tester device for measuring transit time with threshold error correction comprising of an envelope detector, at least two comparators and at least two counters.

In another embodiment of the invention disclosed is an ultrasonic pulse velocity tester device for measuring ultrasonic transit time wherein the two comparators are low threshold comparator and high threshold comparator and two counters are used for the estimation of ultrasonic transit time.

In yet another embodiment of the invention disclosed is an ultrasonic pulse velocity tester device for measuring transit time wherein each counter comprises of an asynchronous external fast counter placed outside microcontroller and internal slow counter of the microcontroller.

In yet another embodiment of the invention disclosed is an ultrasonic pulse velocity tester device wherein the receiver amplifier gain is controlled by microcontroller or similar device to achieve desired amplitude with the help of comparator outputs.

In yet another embodiment of the invention disclosed is a process for accurately measuring the transit time with threshold error correction comprising: measuring threshold corrected transit time (time 1) without material under test, measuring threshold corrected transit time (time 2) with material under test and subtracting time 2 from time 1. In one example, a method for accurately measuring the transit time with threshold error correction using ultrasonic pulse velocity tester device includes measuring a threshold corrected transit time (time 1) without material under test, measuring a threshold corrected transit time (time 2) with material under test, and subtracting time 2 from time 1.

BRIEF DESCRIPTION OF THE DRAWINGS

The present invention is described, by the way of examples, with reference to the drawings, in which.

DETAILED DESCRIPTION OF THE INVENTION

Figure 1:
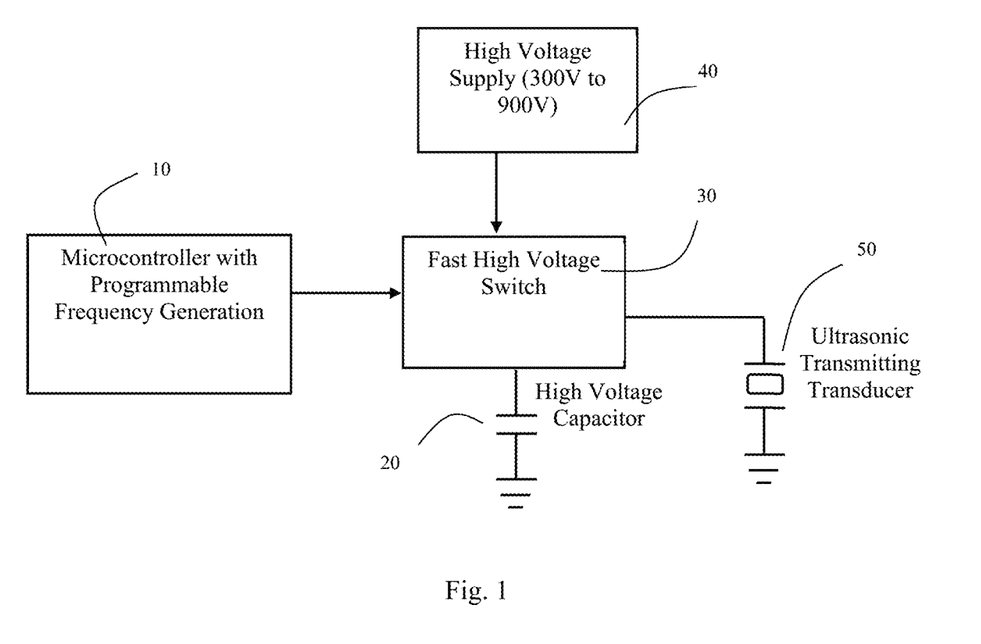
FIG. 1: Schematic diagram depicting the operating principle of the transmitter
Figure 2:
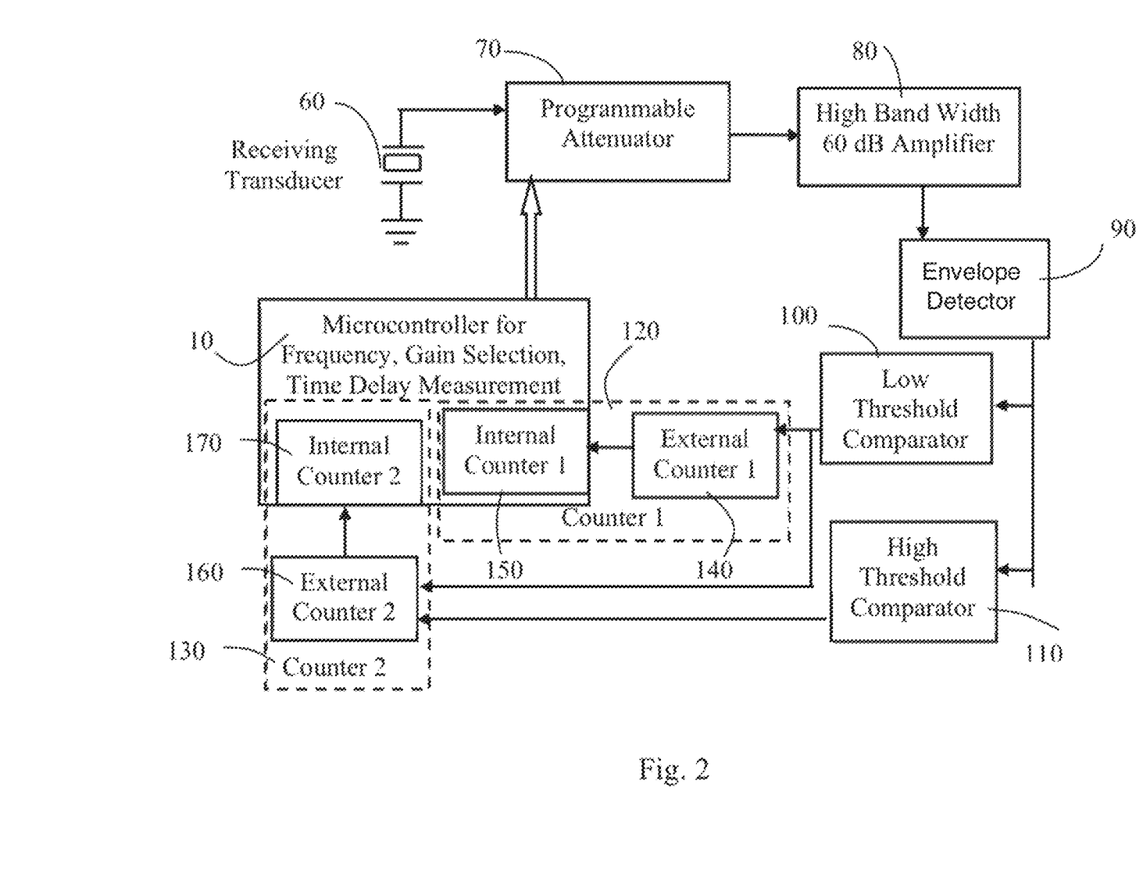
FIG. 2: Block diagram of receiver with auto threshold correction provision.
Figure 3:
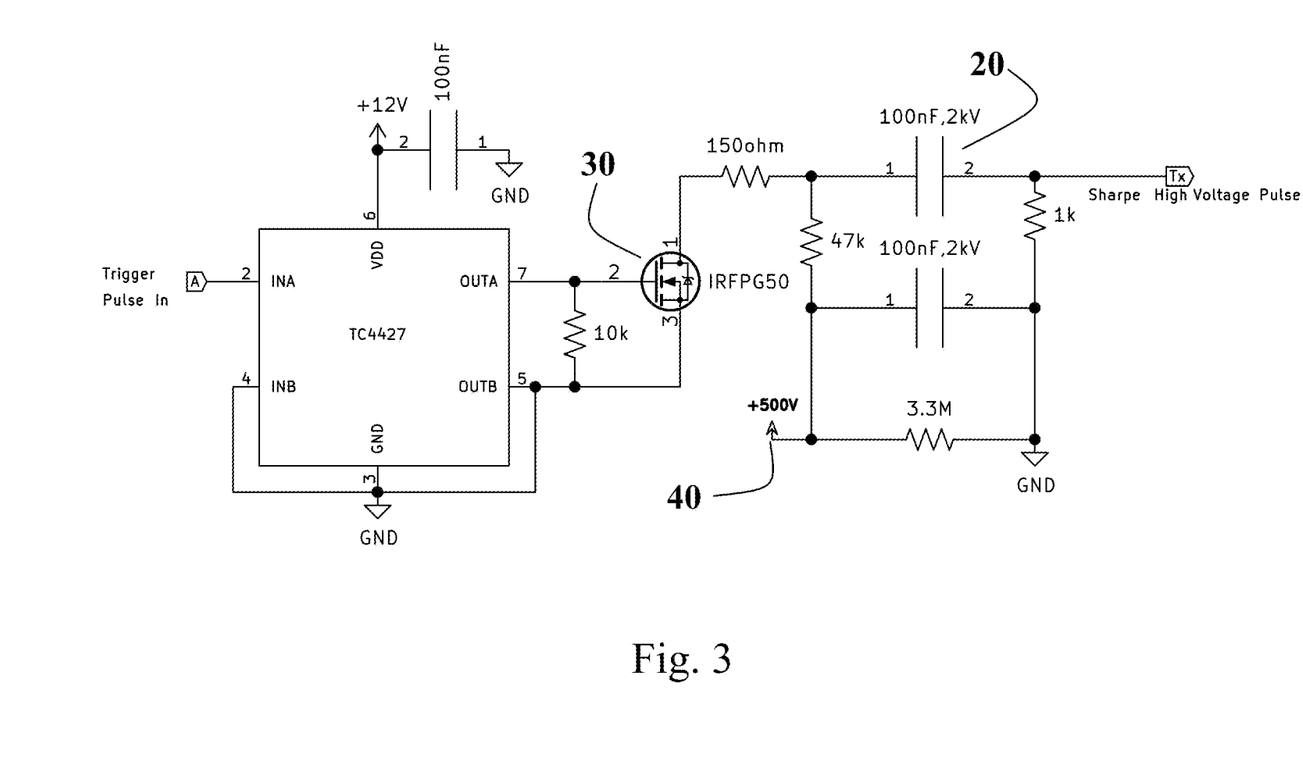
FIG. 3: Detailed circuit diagram of the transmitter circuit.

The FIGS. 1 and 2 shows disclosed ultrasonic pulse velocity (transit time) measuring device consists of preferably but not exclusive a low end 8-bit microcontroller (10) to generate the square wave pulse(s) required to excite the ultrasonic transducer (50). If required, depending on the requirements and to add the processing capability a high end microcontroller such as 32 bit or better may also be preferred. Before exciting the transducer, the controller sends a synchronization pulse (220) which is useful for the other device(s). The transmitted pulse generally narrower of the order of 2-3 microseconds is used to activate a fast high voltage switch (30) realized using MOSFET (IRFPG50). A high voltage capacitor (20) is charged through high voltage source (40) and the charge of the capacitor is pumped into the piezoelectric transducer to generate ultrasound in the desired medium. The detailed circuit of transmitter is shown in FIG. 3.

Figure 4:
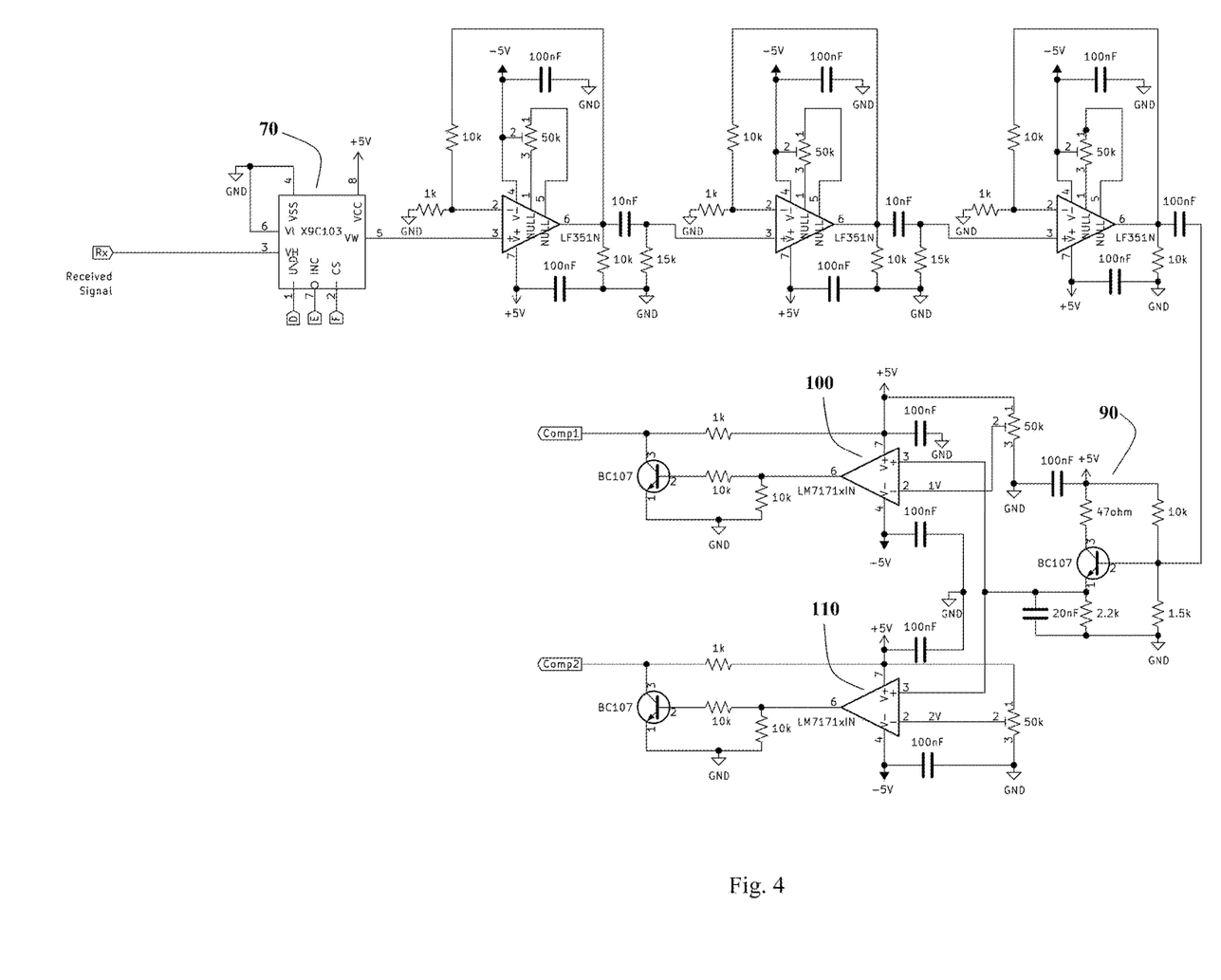
FIG. 4: Detailed circuit diagram of receiver amplifier with comparators to detect two different thresholds
Figure 5:
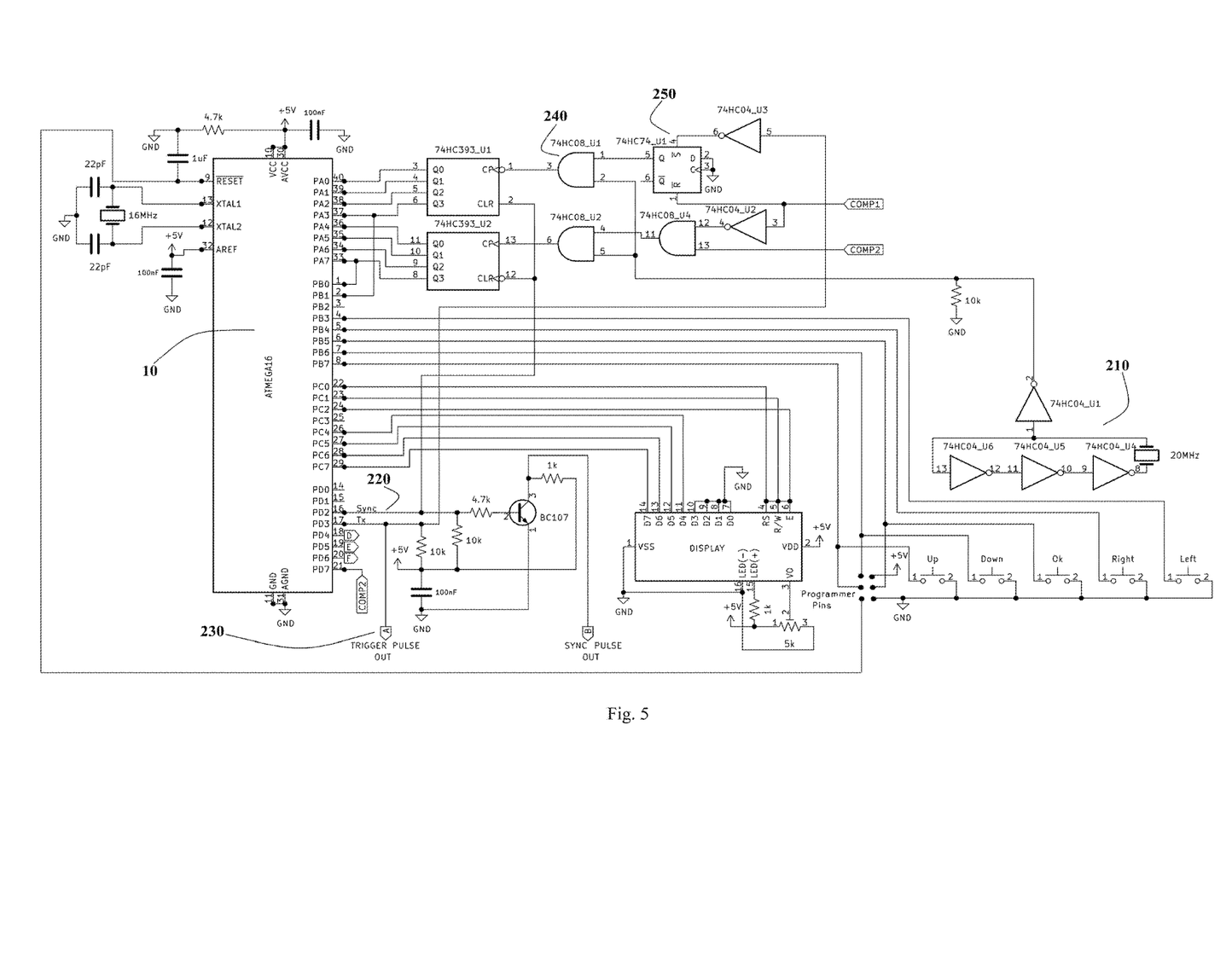
FIG. 5: Detailed circuit diagram of microcontroller interface with fast counters and associated control.

At the receiving end a similar piezoelectric transducer (60) is used to generate electrical pulses in response to the received ultrasonic waves. The received signal is amplified to a sufficient level by broadband amplifier (80) and if required the signal may also be attenuated by the input programmable attenuator (70). The amplified signal is then fed to the active class AB envelope detector (90) which removes the RF component from the signal. The envelope detected signal is then applied simultaneously to two analog voltage comparators. The low threshold voltage comparator (100) has 1V as its DC reference input and the high threshold comparator (110) has 2V as its input reference. The detailed circuit of receiver of the disclosed invention is shown in FIG. 4.

Figure 6:
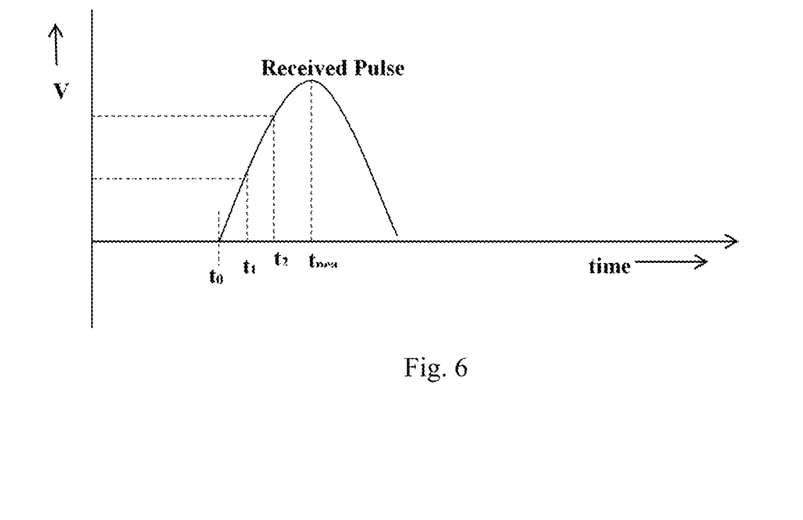
FIG. 6: The effect and contribution of threshold amplitude in the error of pulse arrival delay measurement.

The major drawback of a counter based time delay measurement approach is the error caused due to finite threshold value kept at comparator for the received pulse detection. With a fixed threshold for the pulse detection the amplitude of pulse plays key role in the accuracy of pulse arrival time detection. FIG. 6 indicates typical envelop detected pulse which is fed to the comparators for detection of pulse arrival. The actual arrival of the received pulse has to be considered only at the beginning that is at $t_0$. However, detection of this point is extremely difficult due to presence of finite amplitude of electrical noise. Therefore, only certain finite amplitude threshold well above the noise level is considered as the pulse arrival and is treated as the reference for the comparator. This finite amplitude threshold results in the error and generally the excess time delay measurement. This error due to the threshold is also function of the amplitude of received signal. So, up to certain level the error can be minimized by increasing the gain of receiver to produce pulse of large amplitude so the detection can be made close to $t_0$. However, the possibility of error becomes more prone if the material being tested is highly attenuating. Therefore, a method to overcome this limitation needs to be developed.

The disclosed invention avoids error due to threshold in ultrasonic transit time measurement. The concept is based on consideration of pulse shape as a linear rise in amplitude with time. This is approximated particularly after providing sufficient gain at the receiver so the pulse amplitudes cross the second comparator (110) before 60°.

Figure 7:
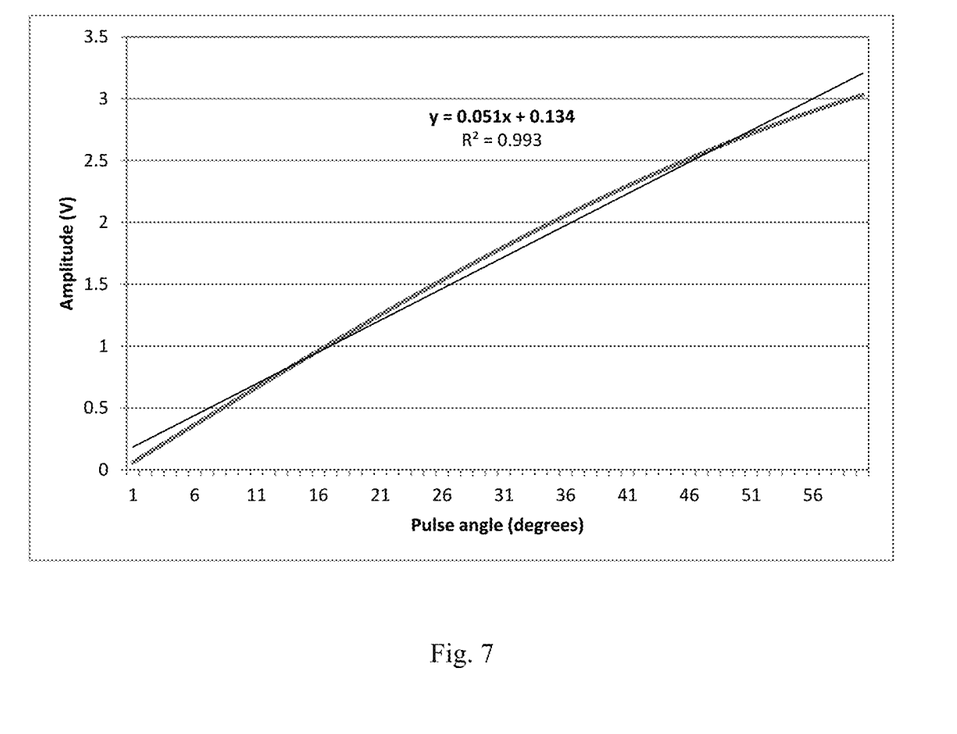
FIG. 7: Typical curve fitting for a sine approximated pulse from arrival to up to 60°.
Figure 8:
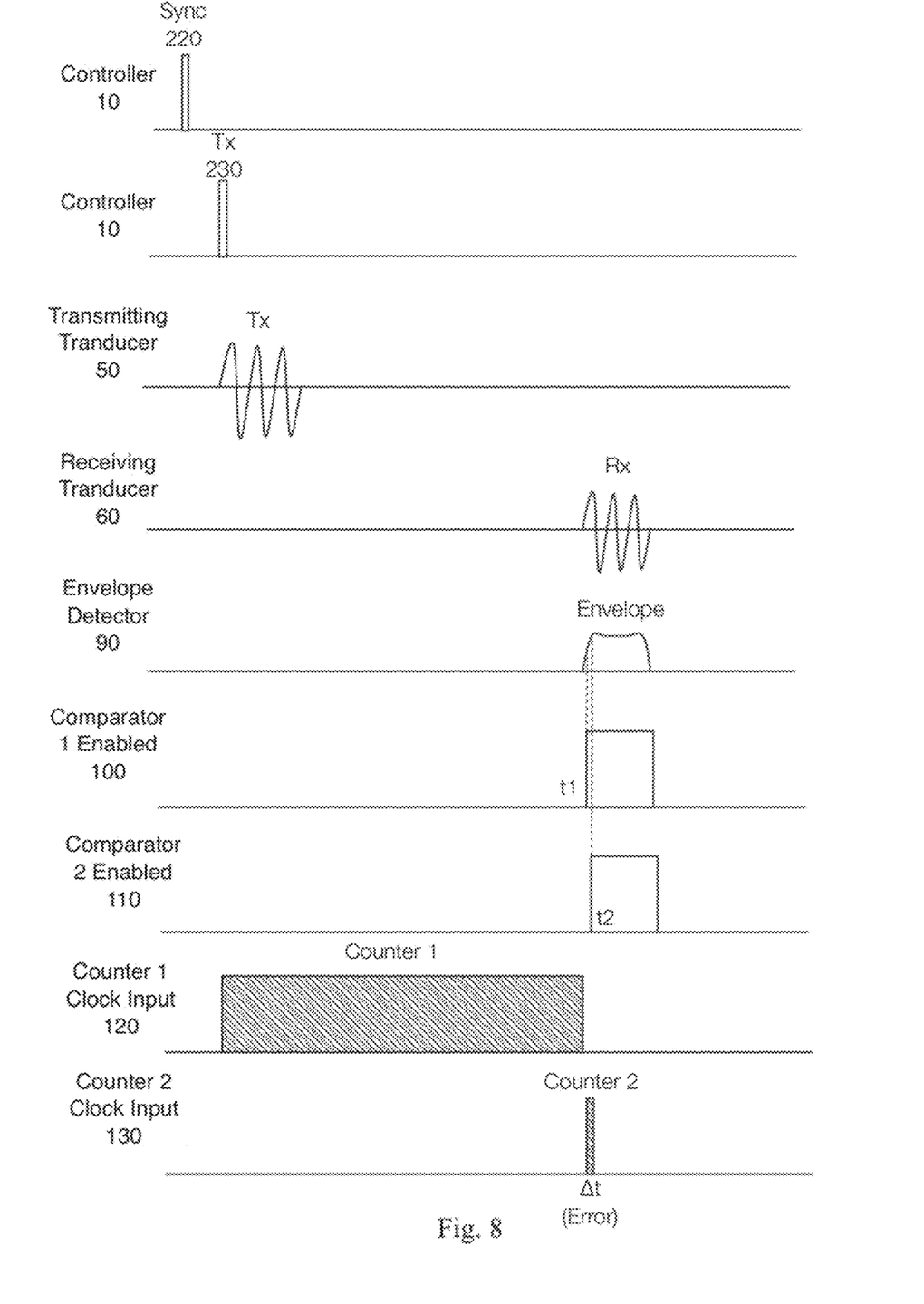
FIG. 8: Detailed timing diagram showing the logic for threshold error detection

FIG. 7 shows the linear fit to a sine pulse having considered maximum amplitude below 60°. The linear fit shows excellent fit with R squared value 0.993. FIG. 8 shows the detailed timing diagram of the developed method indicating the logic for threshold error correction. Two counters are used; the first counter 1(120) is 20 bit and counter 2(130) is 12 bit. The counters can run at extremely fast rate above the general purpose controllers. To run the counters faster IC 74393 is used which can run up to 100 MHz and generate time measurement resolution of 10 ns. The internal counters of microcontroller are driven by respective MSBs of 4 bit binary counters IC 74393. As depicted in the FIG. 8 the sync pulse (220) generated from the microcontroller clears the 74393 counters. The transmitted pulse (230) generated from the controller starts the main 20 bit counter 1 by presetting a flip flop (IC 7474) and the counter 1 is stopped at received receiving a pulse by the low threshold comparator (100) whose reference is kept at 1V. This low threshold comparator also presets a second flip flop to start the second counter 2 and this counter 2 is stopped at receiving the pulse from high threshold comparator (110) whose reference is kept at 2V. Now, the counter 2 indicates the counts proportional to the time delay between $t_1$ and $t_2$. This $\Delta t$ is subtracted from the measured main time delay and the error is compensated.

Figure 9:
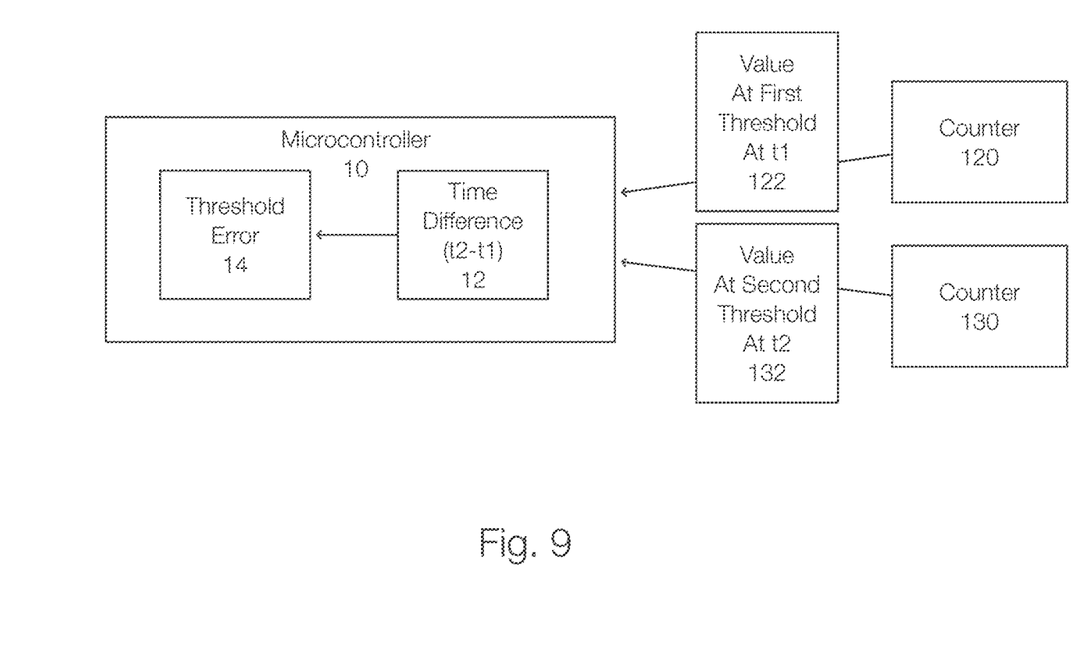
FIG. 9: Threshold error correction calculation using counters.

FIG. 9 illustrates threshold error correction using values obtained from two counters. Counter 120 and 130 generate, respectively, a value 122 at a first threshold at time t1 and a value 132 at a second threshold at time t2. The microcontroller 10 determines a difference 12 (t2−t1). The time difference $\Delta t$ (tw−t1) between the two thresholds is the threshold error 14. The counter 130, a second counter, enables counting a time difference between two thresholds.

EXAMPLES

The following examples are given by way of illustration of the working of the invention in actual practice and should not be construed to limit the scope of the present invention in any way.

Example 1

The present circuit is built by using a general purpose 8-bit microcontroller ATMEGA16 is used for the generation of broadband pulse and square pulses of known frequency. However, any suitable high end or computer may be utilized to perform this function and control

Example 2

A capacitor is used to store charge and the charge is pumped into the exciting transducer using a fast MOSFET (IRFPG50). However, any fast switching device such as MOSFET or BJT or IGBT can be used to achieve the same functionality Example 3

At the receiver end fixed gain voltage amplifier is used to amplify signal above 60 dB. A programmable potentiometer (10 kΩ) of 100 steps is used to attenuate the signal if required.

However, a suitable improved (higher steps) programmable potentiometer can also be utilized to achieve better steps in the gain. A fixed gain amplifier can be replaced with a programmable amplifier and the gain can be controlled by the microcontroller or computer.

Example 4

The transistor envelope detector used to remove the RF components from the received signal is biased in class AB and particularly in such a way that the output at the emitter is just few mV to receive extremely small amplitude. However, in place of transistor any suitable device such as FET or MOSFET may also be used with RC constant at the emitter to remove desired RF.

Example 5

For the generation of radio frequency (RF) needed to run the counters, NOT gates based crystal oscillator widely used has been preferred and used. Crystal was preferred to have stable frequency of 20 MHz. Here, 20 MHz is selected to achieve time measurement resolution of 50 ns. However, suitable higher frequency may be used to achieve better resolution depending on requirement. The frequency generation can also be made with other commercial crystal based clock generator modules.

Example 6

The counters used herein this case are hybrid to achieve fast counting rate and overcome limitations of counters within the controller. Here hybrid counters mean lower four bits of the counters are outside with extremely fast counting capability and the remaining bits are the internal counter bits of controller. Whereas, the internal counters may or may not have faster counting rate as the external ones are. However, the maximum counting rate of internal counters should be at least $\frac{1}{16}^{th}$ of the rate of external counters.

Example 7

In the disclosed invention the hybrid counter contains external fast and internal slow counters. However, if extremely fast counters are being used only internal counters may also be used to achieve the logic for threshold error correction. Or if required full external counters may also be used for the same purpose.

Example 8

In the present invention the initialization (clear) of external counter is done with help of transmitted pulse generated by the microcontroller and the AND gate is enabled/disabled by the external flip-flop IC 7474 in terms of preset and clear. The IC 7474 may also be replaced with suitable flip flop having similar functionality.

Advantages

The main advantages of the present invention are:
1. MOSFET based capacitor discharge based excitation module to deliver high power.
2. The provision of providing automatic threshold error correction will result in ultrasonic transit time (delay) measurement relatively accurate.
3. The transit time measurement involving difference in the threshold corrected zero offset and threshold corrected material time delay ultimately minimizes the error in the actual transit time measurement.
4. Highly sensitive envelop detector may detect small signal amplitude.
5. Inclusion of two counters (delta) approach also detects wrong pulses and hence avoids possibility of wrong measurement.
6. Fast 4-bit counters external to effectively increase the resolution of up to 10 ns which is extremely difficult by even with high end microcontrollers.

The invention claimed is:
1. An ultrasonic pulse velocity tester device for measuring transit time of a material with threshold error correction comprising:
   an envelope detector,
   at least two comparators,
   at least two counters including a first counter and a second counter,
   a transmitting transducer,
   a receiving transducer being attached to a receiving amplifier through a programmable attenuator, and
   a microcontroller to compensate a threshold error automatically,
   wherein:
   the threshold error correction is calculated using values obtained from the at least two counters,
   the first counter counts the transit time with the threshold error,
   the second counter enables counting a time difference between two thresholds, and
   the time difference between the two thresholds is the threshold error.
2. The ultrasonic pulse velocity tester device of claim 1, wherein the material is one of a metallic, a non-metallic, and a concrete material supporting ultrasonic propagation.
3. The ultrasonic pulse velocity tester device of claim 1, wherein the at least two comparators comprises a low threshold comparator and a high threshold comparator.
4. The ultrasonic pulse velocity tester device of claim 1, wherein the transit time is measured using the first counter and the second counter, wherein
   the first counter includes a first internal counter and a first asynchronous external counter, and
   the second counter includes a second internal counter and a second asynchronous external counter.
5. The ultrasonic pulse velocity tester device of claim 4, wherein:
   the first asynchronous external counter and the second asynchronous external counter are placed outside the microcontroller,
   a most significant bit of the first asynchronous external counter acts as a clock input for the first internal counter,
   a most significant bit of the second asynchronous external counter acts as a clock input for the second internal counter, and the first internal counter and the second internal counter are placed inside the microcontroller.

6. The ultrasonic pulse velocity tester device of claim 5, wherein each of the first asynchronous external counter and the second asynchronous external counter is a fast counter and each of the first internal counter and the second internal counter is a slow counter.

7. The ultrasonic pulse velocity tester device of claim 6, wherein the first asynchronous external counter and the second asynchronous external counter are driven in a following manner:
   i. each of the first asynchronous external counter and the second asynchronous external counter is cleared by a synchronization pulse or a transmitter pulse triggering the receiving transducer;
   ii. a clock of the first asynchronous external counter is enabled by an AND gate and a preset of a flip flop, and the first asynchronous external counter is disabled by an output of a low threshold comparator of the at least two comparators, connected to a clear of a flip flop; and
   iii. a clock of the second asynchronous external counter is enabled by a combination of two AND gates with help of the output of the low threshold comparator and an output of a high threshold comparator of the at least two comparators.

8. The ultrasonic pulse velocity tester device as claimed in claim 1, wherein the second counter is running at a same clock rate or higher of that of the first counter to achieve a same time resolution or better.

9. The ultrasonic pulse velocity tester device as claimed in claim 1, wherein a gain of the receiving amplifier is controlled by the microcontroller selected from Arm, PIC and STM 32 to achieve a desired amplitude with help of outputs of the at least two comparators.

10. The ultrasonic pulse velocity tester device of claim 1, wherein a receiving amplifier output is envelope detected by the envelope detector using a bipolar junction transistor (BJT) or a transistor selected from field effect transistor (FET) or a metal-oxide semiconductor field-effect transistor (MOSFET) to work in class AB mode, and an operating point is selected in such a way that the operating point is just above a cutoff.

11. The ultrasonic pulse velocity tester device of claim 1, wherein a time constant of parallel RC of the envelope detector is related to an operating frequency of the receiving transducer.

12. The ultrasonic pulse velocity tester device of claim 1, wherein the second counter is used for a purpose of correction in ultrasonic transit time measurement using software or hardware.

13. The ultrasonic pulse velocity tester device of claim 1, wherein an accurate transit time measurement is obtained by subtracting a threshold corrected zero offset without material under test from a threshold corrected transit time with material under test.

14. A method for accurately measuring the transit time with threshold error correction using ultrasonic pulse velocity tester device of claim 1, the method comprising:
   measuring a threshold corrected transit time (time 1) without material under test,
   measuring a threshold corrected transit time (time 2) with material under test, and
   subtracting time 2 from time 1.

* * * * *